(12) United States Patent
Hsieh et al.

(10) Patent No.: US 11,009,728 B2
(45) Date of Patent: May 18, 2021

(54) SCREEN PRIVACY DEVICES WITH ALTERNATING POLYMER-DISPERSED LIQUID CRYSTAL BANDS

(71) Applicant: HEWLETT-PACKARD DEVELOPMENT COMPANY, L.P., Spring, TX (US)

(72) Inventors: Hsing-Hung Hsieh, Taipei (TW); Chi Hao Chang, Taipei (TW); Ann Alejandro Villegas, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/979,298

(22) PCT Filed: Jul. 2, 2018

(86) PCT No.: PCT/US2018/040638
§ 371 (c)(1),
(2) Date: Sep. 9, 2020

(87) PCT Pub. No.: WO2020/009693
PCT Pub. Date: Jan. 9, 2020

(65) Prior Publication Data
US 2020/0400980 A1    Dec. 24, 2020

(51) Int. Cl.
*G02F 1/13*     (2006.01)
*G02F 1/133*    (2006.01)
*G02F 1/1334*   (2006.01)

(52) U.S. Cl.
CPC ......... *G02F 1/1323* (2013.01); *G02F 1/1334* (2013.01); *G02F 1/13306* (2013.01)

(58) Field of Classification Search
CPC .. G02F 1/1323; G02F 1/13306; G02F 1/1334; G02B 5/0236; G02B 5/0257; G06F 21/84
See application file for complete search history.

(56) References Cited

U.S. PATENT DOCUMENTS

| 6,897,936 B1 | 5/2005 | Li et al. |
| 2006/0044290 A1 | 3/2006 | Hurwitz et al. |
| 2014/0226093 A1 | 8/2014 | Schwartz et al. |
| 2016/0011441 A1 | 1/2016 | Schwartz et al. |
| 2017/0269400 A1 | 9/2017 | Northrup et al. |

(Continued)

FOREIGN PATENT DOCUMENTS

WO    WO-2018014468 A1    1/2018

OTHER PUBLICATIONS

Chun-Wei Su; "Color Transparent Display Using Polymer-Dispersed Liquid Crystal"; Sep. 18, 2015; IEEE; pp. 31-34.

*Primary Examiner* — Donald L Raleigh
(74) *Attorney, Agent, or Firm* — Fabian VanCott

(57) ABSTRACT

In one example in accordance with the present disclosure, a screen privacy device is described. The screen privacy device includes first bands of a polymer-dispersed liquid crystal (PDLC) compound. These first bands have first light-scattering properties. The screen privacy device also includes second bands of the PDLC compound, the second bands having second light-scattering properties. In this example, the second light-scattering properties are different than the first light-scattering properties and the first bands and the second bands alternate along a dimension of the screen privacy device.

15 Claims, 12 Drawing Sheets

(56) References Cited

U.S. PATENT DOCUMENTS

| | | |
|---|---|---|
| 2017/0351126 A1 | 12/2017 | Chu et al. |
| 2018/0052263 A1* | 2/2018 | Chen ........................ G02B 5/23 |
| 2018/0052357 A1* | 2/2018 | Li ..................... G02F 1/133509 |
| 2018/0129084 A1 | 5/2018 | Wu et al. |

* cited by examiner

SCREEN PRIVACY DEVICES WITH ALTERNATING POLYMER-DISPERSED LIQUID CRYSTAL BANDS

BACKGROUND

Electronic devices include display screens to present information to a user. Examples of display screens include liquid crystal displays, light-emitting diode displays, video display units, and the like. Such devices are used in many areas of professional and everyday life throughout the world. These electronic devices and corresponding display screens are used to access and display all sorts of information.

BRIEF DESCRIPTION OF THE DRAWINGS

The accompanying drawings illustrate various examples of the principles described herein and are part of the specification. The illustrated examples are given merely for illustration, and do not limit the scope of the claims.

Figure 1:
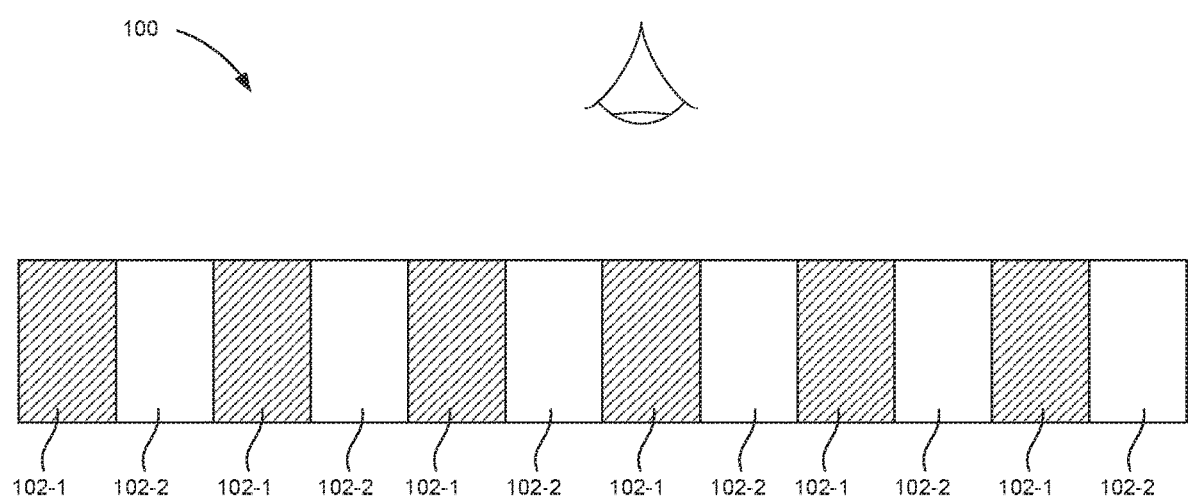
FIG. 1 is a cross-sectional diagram of a screen privacy device with alternating polymer-dispersed liquid crystal (PDLC) bands, according to an example of the principles described herein.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

As described above, electronic devices are commonplace in today's society. With the continued development of these devices, their use in society will continue to increase. Electronic devices placed in public spaces for public use is one example of electronic device use that is on the rise. For example, kiosks are used in public places to deliver services to the public in general. While such electronic device usage is of great benefit to society, some characteristics limit their more widespread use.

Specifically, in some cases, the information displayed to a user may be private and confidential, intended just for a certain individual or group of individuals. For example, a hospital kiosk may present, or prompt entry of, certain confidential medical information. It may be difficult to keep such information private, for example when the electronic device is in a public area.

While specific reference has been made to use in a hospital setting, such public devices may be used in other contexts. Another such example is an automated teller machine ("ATM") into which a user enters financial information such as an access code to the users financial accounts. In such cases, there is a possibility that the displayed information may be seen by unauthorized people who may use the information to the disadvantage of a person or persons to whom the information pertains.

There may be other circumstances in which it is desirable to maintain privacy of the information displayed on an electronic device. For example, laptops or notebook computers may be used in crowded public areas such as airports, train stations, or other public areas. Such devices may be used for personal matters, such as writing a letter or working on professional matters that may involve sensitive or otherwise confidential information. When used in these areas, there is no guarantee that such information will remain private or confidential as passersby may be able to view the electronic device display screen and ascertain the information therein. More specifically, there may be a general concern that a nearby person, such as the person in the next airplane seat, may be reading the information on the laptop or notebook computer. If the computer or other electronic device is used in this way, sensitive data may be stolen or otherwise compromised. This concern may keep many people from using a laptop computer in many instances when its use would be particularly convenient.

Accordingly, the present specification describes devices for increasing a privacy level for a display screen. Specifically, the present specification describes a screen privacy device that relies on polymer-dispersed liquid crystals (PDLCs) to increase privacy of a display screen. In a PDLC compound, liquid crystals can be either misaligned or aligned. When misaligned, light emanating from the display screen is scattered at different angles. As such, light can be distributed in wider angles compared to the original light source. A voltage applied to the PDLC compound aligns the liquid crystals such that light passes through relatively un-scattered. As such, emanating light maintains its original angular distribution. Thus, the PDLC compound changes the privacy level of the information on the display screen.

Specifically, the present specification describes a screen privacy device. The screen privacy device includes first bands of a polymer-dispersed liquid crystal (PDLC) compound. The first bands have first light-scattering properties. The screen privacy device also includes second bands of the PDLC compound. The second bands have second light-scattering properties. In this example, the second light-scattering properties are different than the first light-scattering properties and the first bands and the second bands alternate along a dimension of the screen privacy device.

The present specification also describes a method of forming a screen privacy device. According to the method, a first polymerizing treatment is applied to a PDLC compound. A mask is then applied to alternating bands of the PDLC compound. A second polymerizing treatment is applied to the un-masked portions of the PDLC compound to form alternating bands of the PDLC compound that have different light-scattering properties.

The present specification also describes a display device. The display device includes at least 1) a screen to generate a visual output and 2) a screen privacy device disposed over the screen. The screen privacy device includes a PDLC compound which is divided into alternating bands. Adjacent bands have, when a voltage is applied, different light-scattering properties. The display device also includes a pair of electrodes disposed on opposite surfaces of the PDLC compound to selectively apply a voltage potential across the PDLC compound and a controller to pass a voltage to the pair of electrodes to selectively switch the PDLC compound between a sharing mode and a privacy mode.

In summary, using such a privacy screen device 1) provides enhanced security of private or confidential information presented on a display screen; 2) provides single-layer privacy, resulting in a thinner and more cost-effective screen privacy device; 3) provides screen privacy at a reduced power consumption level; 4) provides an enhanced viewing angle when in a sharing mode; and 5) is easy to manufacture. However, the devices disclosed herein may address other matters and deficiencies in a number of technical areas.

As used in the present specification and in the appended claims, the term "viewing area" and similar terminology refers broadly to an area wherein an individual sitting may view a corresponding portion of a display screen. A user outside of the viewing area, on account of the PDLCs being activated, cannot view the corresponding portion of the display screen.

Further, as used in the present specification and in the appended claims, the term "off" and "on" refer to whether a voltage is applied to a PDLC compound and affects a PDLCs ability to either scatter light or allow the light to pass un-scattered.

Further, as used in the present specification and in the appended claims, the term "light-scattering properties" refers to how the contents of a PDLC compound scatter light emanating from a display screen. For example, a fully-polymerized PDLC compound may be defined by its light-scattering properties wherein it scatters light in various directions when no voltage is applied, and allows light to pass un-scattered when voltage is applied. By comparison, an overdosed PDLC compound may have light-scattering properties that scatter light in various directions when no voltage is applied and similarly scatter light in various directions when a voltage is applied. The light-scattering properties may indicate how the PDLC compound changes based on an applied voltage and may indicate an alignment of the liquid crystals disposed in the polymer matrix.

Still further, as used in the present specification and in the appended claims, the term "fully-polymerized" refers to a PDLC compound whose refractive index has saturated, meaning it does not change with further exposure to ultraviolet light but the liquid crystals therein still rotate in the presence of an applied voltage.

By comparison, as used in the present specification and in the appended claims, the term "partially-polymerized" refers to a PDLC compound whose refractive index has not saturated, meaning it changes with further exposure to ultraviolet light.

Still further, as used in the present specification and in the appended claims, the term "over dosed" refers to a PDLC compound whose refractive index has saturated and has been over exposed to ultraviolet light such that the liquid crystals no longer rotate in the presence of an applied voltage.

Turning now to the figures, FIG. 1 is a cross-sectional diagram of a screen privacy device (100) with alternating polymer-dispersed liquid crystal (PDLC) bands (102), according to an example of the principles described herein. In FIG. 1, the screen privacy device (100) is depicted as if a display screen were underneath the screen privacy device (100) and a viewer is looking at it from above.

As described above, the screen privacy device (100) may provide privacy to the user of an electronic device by altering the transmission of light through the screen privacy device (100) as it is disposed over or under a display screen. In this position, the screen privacy device (100) controls the viewability of the display screen. In other words, the screen privacy device (100) is a privacy filter/screen that provides privacy during the use of an electronic device such as a laptop computer or other electronic device by restricting the viewing angle through which the display screen of the electronic device may be viewed so that just a person sitting directly in front of the screen may read the data written on it. In one example, this angle may be reduced by placing the screen privacy device (100) across the front of the electronic device display screen, so that the electronic device display screen is viewed through the privacy device.

The selective reduction of the viewing angle of the display screen is carried out by the polymer-dispersed liquid crystal (PDLC) compound that is included in the screen privacy device (100). That is, the viewing angle, related to viewability of the display as a result of the screen privacy device (100), may be controlled (e.g., increased or decreased) by liquid crystals within the PDLC compound. For example, a PDLC compound may be electronically switched between a transparent state and a light-scattering state. In the light-scattering state, the viewing angle of the screen may be increased because light from screen pixels hits the liquid crystals which are misaligned, and is scattered at various angles, which generates wider angle distribution of light. By comparison, while in a transparent state, the PDLC compound allows the light to propagate un-scattered. In other words, angular light distribution is un-changed.

As described above, the PDLC compound includes liquid crystals in a polymer matrix. When a voltage is not applied to the PDLC compound, the liquid crystals are not aligned with one another. However, when a voltage is applied to the PDLC compound, the liquid crystals align with one another. When the liquid crystals are not aligned with one another, they each reflect light in different directions, thus scattering light and increasing the viewing angle of the display screen. By comparison, when the liquid crystals are aligned with one another, they all reflect light in the same direction. This reflecting of light in the same direction serves to allow light to pass relatively unaltered from or to the display screen.

The solid polymer matrix may be formed of any suitable material including glass or plastic. Examples of glasses that may be used as the solid polymer matrix include soda lime glass, alkali glass, boron silicate glass, non-alkali metal aluminum silicate glass, and fused silica glass, among other glasses. Examples of plastics that may be used as the solid polymer matrix include optical substrates, such as poly (methyl-methacrylate) ("PMMA"), polyethylene terephthalate ("PET"), cyclic olefin copolymer ("COC"), polycarbonate, and polyimide; transparent plastics; and transparent plastic composites.

The characteristics of the polymerization treatment used to form the PDLC compound can affect the light-scattering properties of the PDLC compound. For example, if an ultraviolet light is applied for too short a time, the refractive index of the PDLC compound may not be saturated. By comparison, by applying the ultraviolet light for a longer period of time, the refractive index of the PDLC compound may be saturated. An unsaturated PDLC compound may have a different refractive index, and thus different light scattering properties, than a fully-saturated PDLC compound.

As yet another example, applying an ultraviolet light for too long a period of time may immobilize the liquid crystals therein. That is, as described above, when a voltage is applied to a PDLC compound, light scattering properties change based on a rotation of the liquid crystals therein. When the liquid crystals are immobilized they no longer rotate and thus do not facilitate the selective reduction of a viewing area of a display screen.

The present screen privacy device (100) utilizes these different light-scattering properties to provide a user with privacy when viewing a display screen. That is, the screen privacy device (100) includes a single layer of a PDLC compound, but that is divided into alternating bands (102) with the PDLC compound in each band (102) having different light scattering properties.

Note that in FIG. 1 different bands (102) are identified by the fill therein. That is, a cross-hatch fill indicates a band that is one of the first bands (102-1) with first light-scattering properties and no fill indicates a band that is one of the second bands (102-2) with second light-scattering properties. That is, the present screen privacy device (100) includes first bands (102-1) of a PDLC compound. The PDLC compound in these first bands (102-1) have first light-scattering properties. The screen privacy device (100) also includes second bands (102-2) of the PDLC compound. The PDLC compound in these second bands (102-2) have second light-scattering properties. As described above, the light scattering properties of the first bands (102-1) and the light-scattering properties of the second bands (102-2) are different form one another.

Moreover, as depicted in FIG. 1, the first bands (102-1) and second bands (102-2) alternate along a dimension of the screen privacy device (100). That is, the screen privacy device (100) may have a form factor that aligns with the display screen. In this example, the bands (102) may run in one direction, i.e., vertically and may extend along another direction, i.e., horizontally. In other examples, the direction that the bands (102) run may vary.

Note that while FIG. 1 depicts two sets of bands, i.e., first bands (102-1) and second bands (102-2). Any number of bands (102) of PDLC compound may be implemented in accordance with the principles described herein, each band (102) having different light scattering properties. Note that in these examples, there is a single layer of PDLC compound, but that each band (102) has different light scattering properties.

The screen privacy device (100) as described herein enhances the privacy a user can expect when viewing a display screen and does so in an effective manner. That is, rather than having multiple layers to provide the privacy (i.e., a louver film and a PDLC layer), the screen privacy device (100) provides privacy via a single layer. Doing so results in a thinner and lighter screen privacy device (100) which is less complex to use and also to manufacture.

Moreover, in this example, the screen privacy device (100) can be placed on top of, rather than underneath the display screen or between layers of the display screen. Moreover, the screen privacy device (100) provides enhanced viewing angles when in a sharing mode as compared to other privacy devices.

Figure 2A:
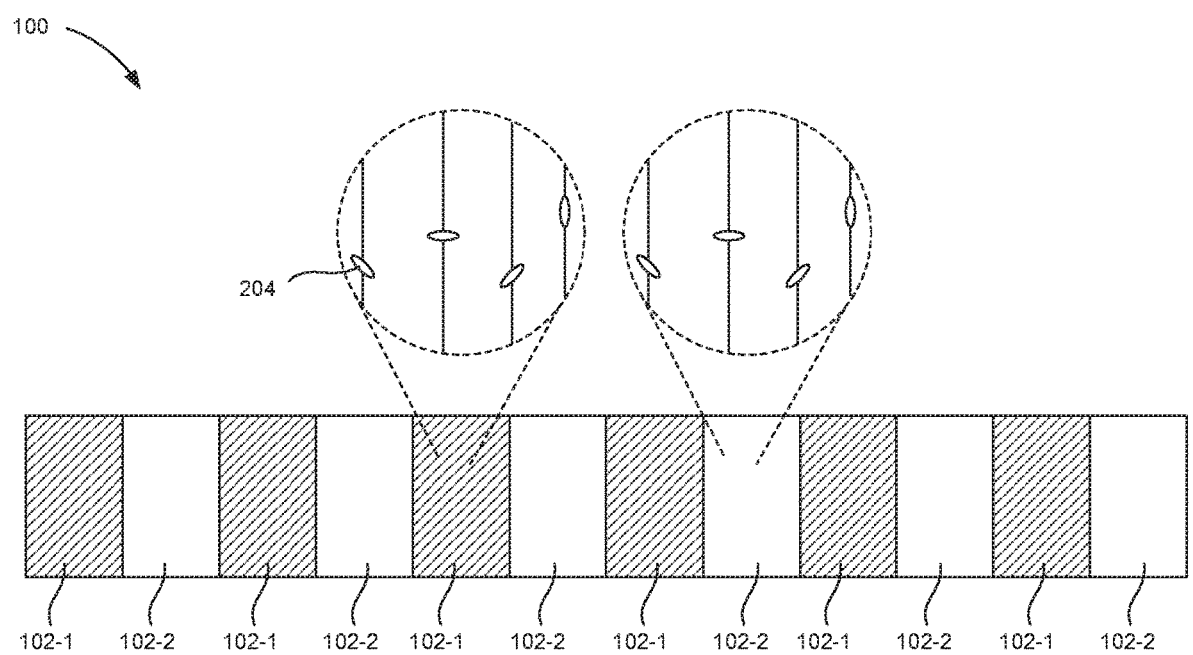
FIGS. 2A and 2B are cross-sectional diagrams of a screen privacy device with alternating PDLC bands, according to an example of the principles described herein.
Figure 2B:
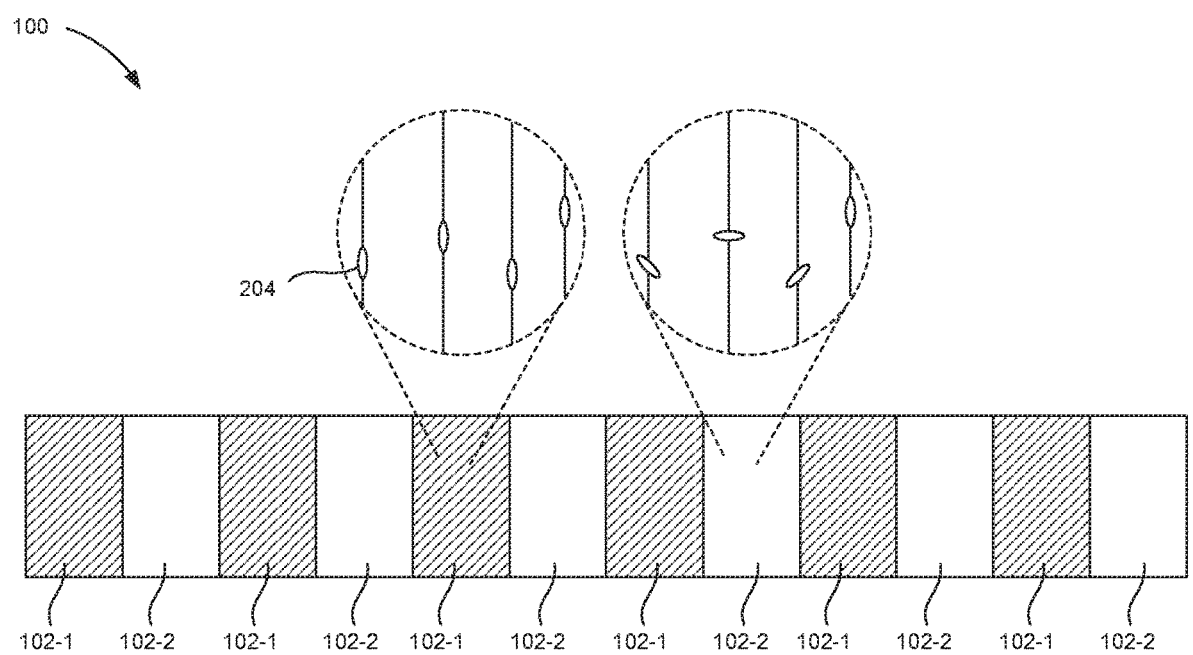

FIGS. 2A and 2B are cross-sectional diagrams of a screen privacy device (100) with alternating PDLC bands (102), according to an example of the principles described herein. Specifically, FIG. 2A is a cross-sectional diagram when no voltage is applied to the screen privacy device (100) and FIG. 2B is a cross-sectional diagram when a voltage is applied to the screen privacy device (100).

As described above, the orientation of liquid crystals (204) within a polymer matrix determines a viewing angle. That is, if liquid crystals (204) are aligned with one another, light emanating to or from a display screen passes through relatively un-reflected. By comparison, if liquid crystals (204) are not aligned with one another, light emanating to or from a display screen strikes them and due to their different angles, the liquid crystals (204) scatter the light in different directions, thus providing a wider field of view. For simplicity, in the subsequent figures, a single instance of a liquid crystal (204) is indicated with a reference number.

As described above, the different bands (102) of the PDLC compound may have different light-scattering properties. In one example, this means that the liquid crystals (204) in the different bands (102) may react differently in response to an applied voltage. In one specific example depicted in FIGS. 2A and 2B, the first bands (102-1) may be fully-polymerized and the second bands (102-2) may be overdosed.

Fully-polymerized bands (102) indicate that the PDLC compound in that band (102) has saturated. That is, during polymerization, the liquid PDLC compound was exposed to sufficient ultraviolet energy that the refractive index stabilized and would not be changed by further exposure. The PDLC material in fully-polymerized bands (102) has also not been exposed to sufficient amounts of ultraviolet energy to damage the liquid crystals (204) therein.

Overdosed bands (102) indicate that the PDLC compound in that band (102) has saturated and that the liquid crystals (204) therein are no longer responsive to an applied voltage. That is, the liquid crystals (204) do not rotate when a voltage is applied to them.

Returning to FIG. 2A, as depicted therein, when no voltage is applied to the screen privacy device (100), liquid crystals (204) in both the first bands (102-1) and the second bands (102-2) are not aligned with one another. With both bands (102-1, 102-2) having unaligned liquid crystals (204), the screen privacy device (100) may be said to be in a first, or sharing mode. That is, the non-aligned liquid crystals (204) on account of their different angles, reflect light at various angles thus providing a wider viewing angle as compared to a privacy mode.

FIG. 2B depicts a state wherein a voltage is applied to the screen privacy device (100). In this example, the application of the voltage aligns the liquid crystals (204) in the first bands (102-1). However, as the second bands (102-2) include PDLC compound that is overdosed and therefore has unresponsive liquid crystals (204), the liquid crystals (204) in the overdosed second bands (102-2) remain unaligned. With just the overdosed second bands (102-2) having unaligned liquid crystals (204), the screen privacy device (100) may be said to be in a second, or privacy mode. That is, the non-aligned liquid crystals (204) on account of their different angles, reflect light at various angles. However, as the first band (102-1) liquid crystals (204) are now aligned and light is reflected through those bands the same, a narrower viewing angle is provided as compared against when both of the first bands (102-1) and second bands (102-2) had unaligned liquid crystals (204). Thus, the present screen privacy device (100) provides for selective narrowing of the field of view by aligning a portion of the liquid crystals (204) in the screen privacy device (100) while maintaining other portions of the liquid crystals (204) unaligned.

Figure 3A:
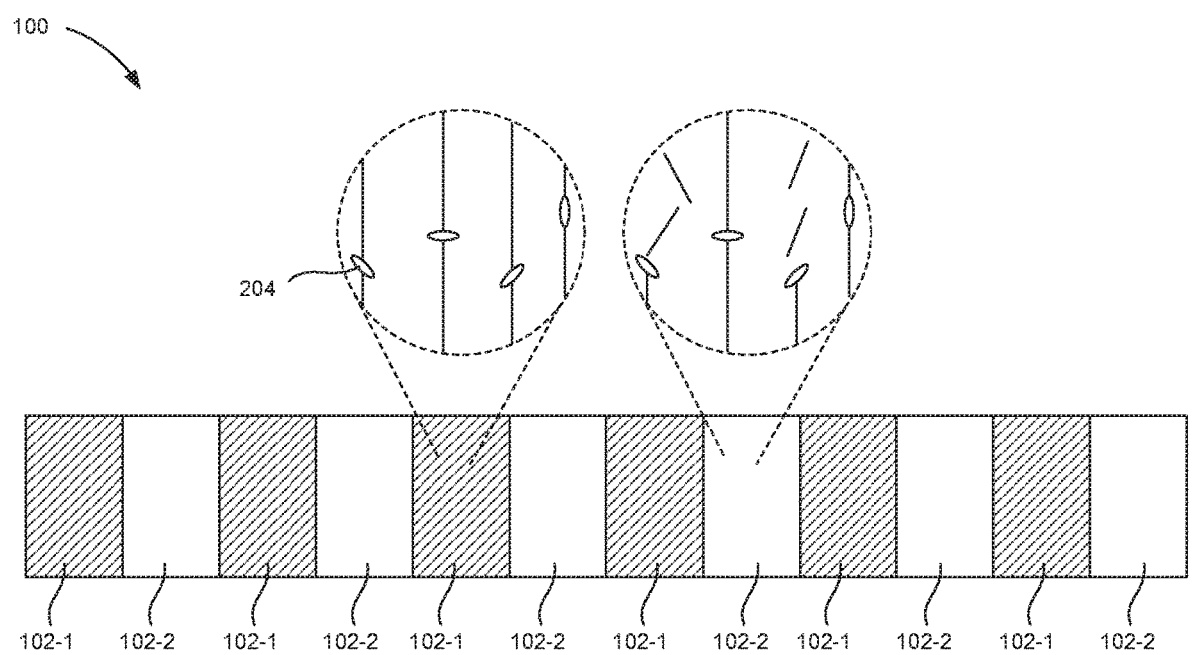
FIGS. 3A and 3B are cross-sectional diagrams of a screen privacy device with alternating PDLC bands, according to another example of the principles described herein.
Figure 3B:
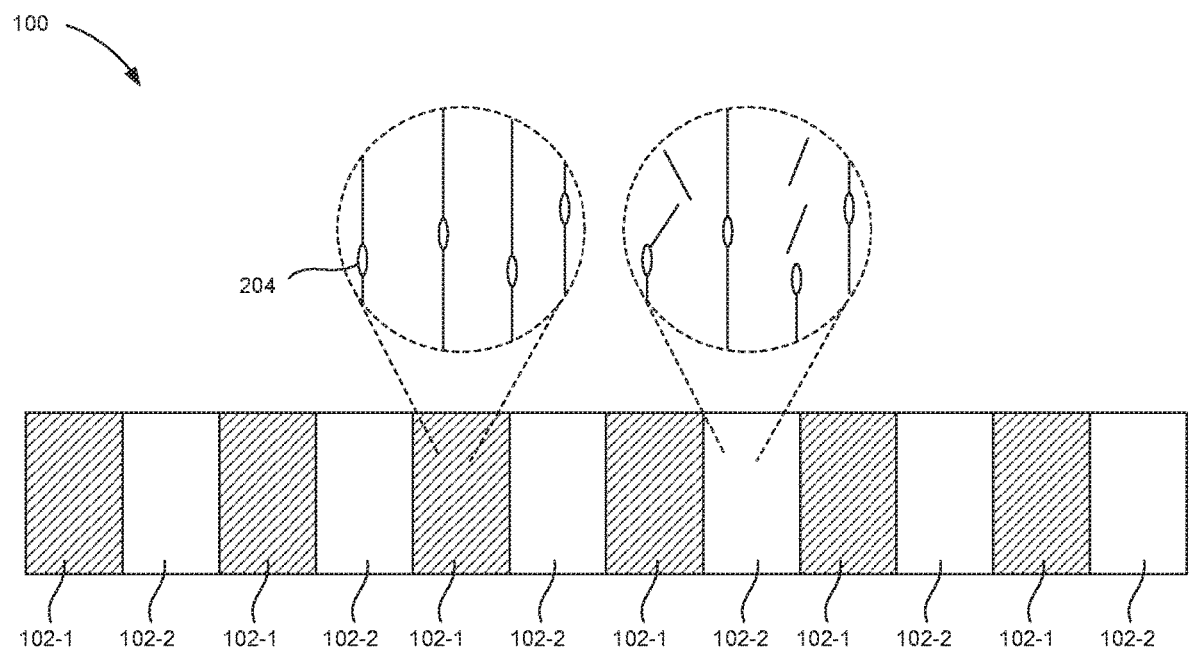

FIGS. 3A and 3B are cross-sectional diagrams of a screen privacy device (100) with alternating PDLC bands (102), according to an example of the principles described herein. Specifically, FIG. 3A is a cross-sectional diagram when no voltage is applied to the screen privacy device (100) and FIG. 3B is a cross-sectional diagram when a voltage is applied to the screen privacy device (100).

As described above, the different bands (102) of the PDLC compound may have different light-scattering properties. In one example, this means that while the liquid crystals (204) in the different bands (102) react similarly to an applied voltage, light is scattered differently based on the makeup of the polymer matrix. As one specific example as depicted in FIGS. 3A and 3B, the first bands (102-1) may be fully-polymerized and the second bands (102-2) may be partially-polymerized.

As described above, fully-polymerized bands (102) indicate that the PDLC compound in that band (102) has saturated. That is, during polymerization, the liquid PDLC compound was exposed to sufficient ultraviolet energy that the refractive index stabilized and would not be changed by further exposure. The PDLC material in fully-polymerized bands (102) has also not been exposed to sufficient amounts of ultraviolet energy to damage the liquid crystals (204) therein.

By comparison, in a partially-polymerized band (102), the PDLC compound in that band (102) has not saturated. That is, were the PDLC compound to have been exposed to more ultraviolet energy, the refractive index would have changed. In FIGS. 3A and 3B the partially-polymerized state of the second bands (102-2) is indicated by the broken lines. In a partially-polymerized band (102), the liquid crystals (204) still may rotate, but a different refractive index is provided due to the different physical properties of the polymer matrix.

Returning to FIG. 3A, as depicted therein, when no voltage is applied to the screen privacy device (100), liquid crystals (204) in both the first bands (102-1) and the second bands (102-2) are not aligned with one another. With both bands (102-1, 102-2) having unaligned liquid crystals (204), the screen privacy device (100) may be said to be in a first, or sharing mode. That is, the non-aligned liquid crystals (204) on account of their different angles, reflect light at various angles thus providing a wider viewing angle of the display screen as compared to a privacy mode.

FIG. 3B depicts a state wherein a voltage is applied to the screen privacy device (100). In this example, the application of the voltage aligns the liquid crystals (204) in the first bands (102-1). The application of the voltage aligns the liquid crystals (204) in the second bands (102-2) as well. However, as the second bands (102-2) include partially-polymerized PDLC compound, the refractive index is different and thus continues to scatter light to a different degree than the first bands (102-1). However, with the liquid crystals (204) in the first bands (102-1) now aligned, the overall light-scattering of the screen privacy device (100) is reduced such that a narrower field of view is created for the display screen as compared to a sharing mode depicted in FIG. 3A.

With just the partially-polymerized second bands (102-2) reflecting light at multiple angles (that is the fully-polymerized first bands (102-1) reflect light at the same angle), the screen privacy device (100) may be said to be in a second, or privacy mode. That is, as the first bands (102-1) liquid crystals (204) are now aligned and light is reflected through those bands the same, a narrower viewing angle is provided for the display screen as compared against when both of the first bands (102-1) and second bands (102-2) had unaligned liquid crystals (204). Thus, the present screen privacy device (100) provides for selective narrowing of the field of view of the display screen. Further, as the refractive index is different between the first bands (102-1) and the second bands (102-2), light at wider angles would be refracted in the interface of the first bands (102-1) and the second bands (102-2), thus providing a narrower field of view.

Figure 4:
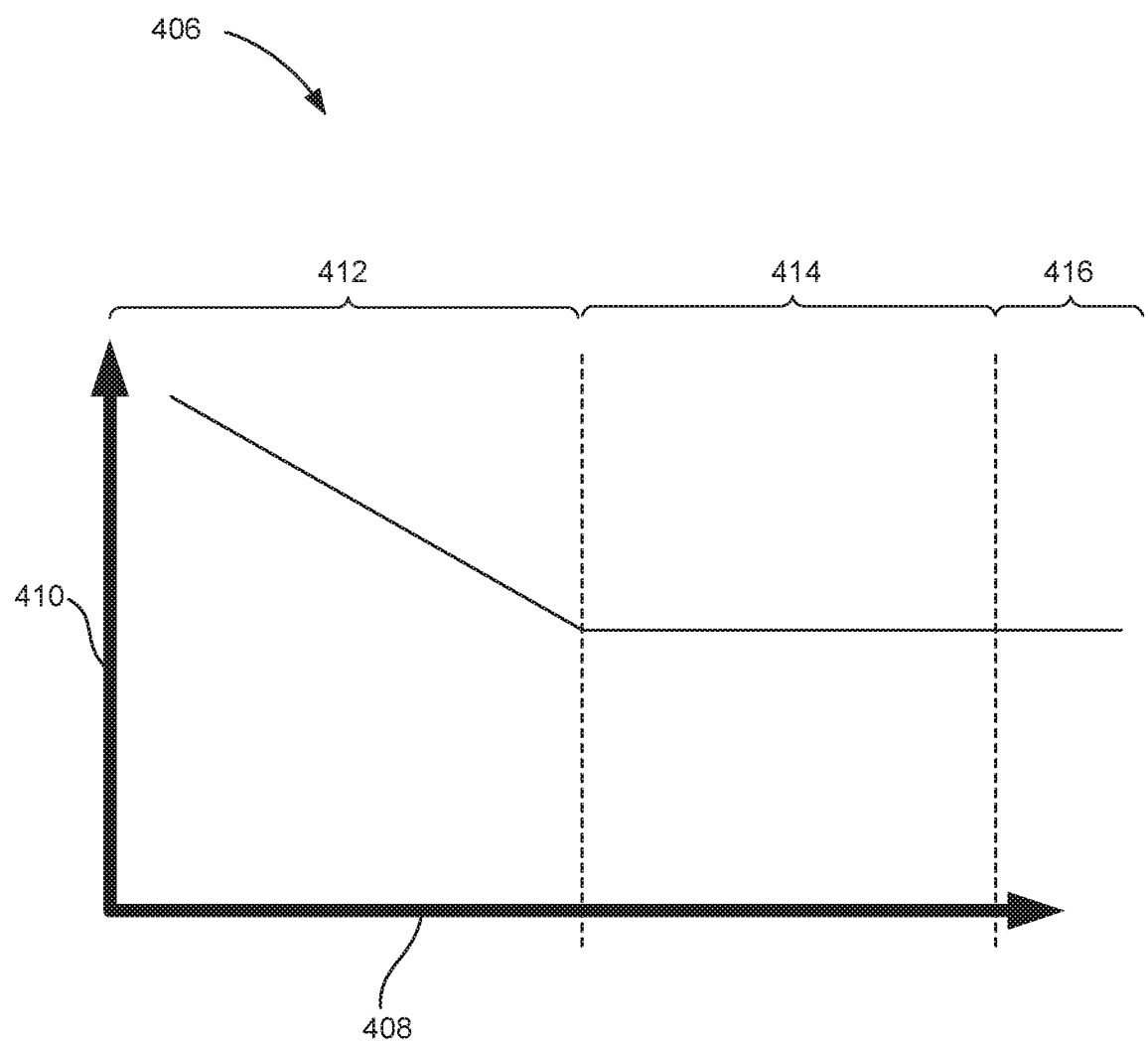
FIG. 4 is a table indicating a partially-polymerized zone, a fully-polymerized zone, and an overdosed zone for a PDLC compound, according to an example of the principles described herein.

FIG. 4 is a table (406) indicating a partially-polymerized zone (412), a fully-polymerized zone (414), and an over-dosed zone (416) for a particular PDLC compound, according to an example of the principles described herein. As described above, a PDLC compound may be partially, fully, or over-polymerized, with each having an impact on the light-scattering properties of the PDLC compound. The table (406) has as its x-axis (408) an ultraviolet dosage indicating an exposure to ultraviolet energy. The y-axis (410) indicates the resultant refractive index. As depicted in the table (406) in FIG. 4, during initial stages of polymerization, i.e., in the partially-polymerized zone (412), as the polymer matrix changes from a liquid to a solid, the refractive index changes as well. If polymerization is to stop in this partially-polymerized zone (412), the resultant PDLC compound may be referred to as a partially-polymerized PDLC compound.

Once a threshold dosage is reached, indicating the beginning of the fully-polymerized zone (414), the refractive index stabilizes, or is saturated. This may be result from the solidification of the entire polymer matrix. If polymerization is to stop in this fully-polymerized zone (414), the resultant PDLC compound may be referred to as a fully-polymerized PDLC compound.

If the ultraviolet dosage is increased to a predetermined amount past the threshold dosage, i.e., is within the overdose region (416), the liquid crystals (FIG. 2, 204) within the PDLC compound may immobilize. For example, the overdose boundary may be 1.5 times past the threshold dosage. If polymerization is to stop in this overdosed zone (416), the resultant PDLC compound may be referred to as an overdosed PDLC compound.

Figure 5:
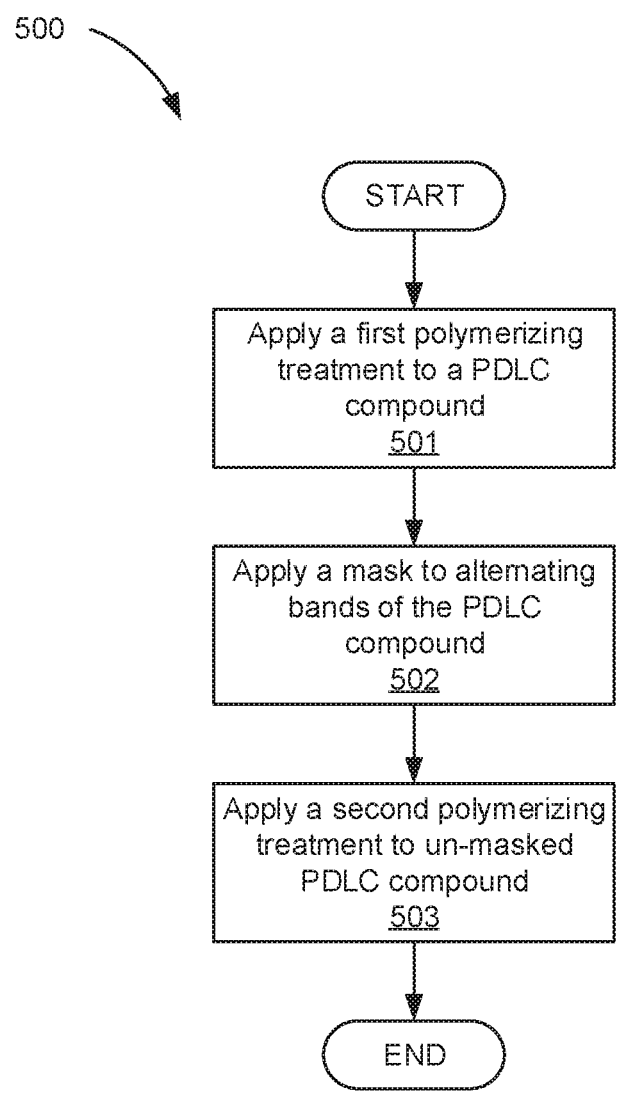
FIG. 5 is a flow chart of a method for forming a screen privacy device with alternating PDLC bands, according to an example of the principles described herein.

FIG. 5 is a flow chart of a method (500) for forming a screen privacy device (FIG. 1, 100) with alternating PDLC bands (FIG. 1, 102), according to an example of the principles described herein.

According to the method (500), a first polymerizing treatment is applied (block 501) to a PDLC compound. That is, a PDLC compound may be disposed on a surface and may be exposed to ultraviolet energy or any other energy that hardens and/or otherwise changes the physical properties of the PDLC compound. The characteristics of the first polymerizing treatment may dictate the degree to which the PDLC compound is polymerized. For example, the first polymerizing treatment may partially-polymerize the PDLC compound. In this example, the PDLC compound may be exposed to ultraviolet light for a period of time to partially, and not fully, polymerize the PDLC compound.

In another example, the first polymerizing treatment may fully-polymerize the PDLC compound. In this example, the PDLC compound may be exposed to ultraviolet light for a longer period of time such that the PDLC compound is fully-polymerized. That is, the difference between fully-polymerizing and partially-polymerizing the PDLC compound may be an amount of time that the PDLC compound is exposed to the ultraviolet light. In another example, the difference may be a wavelength and/or temperature of the ultraviolet light that exposes the PDLC compound. As a result of the application (block 501) of the first polymerizing treatment, the entire surface of the PDLC compound is similarly polymerized, and has similar light scattering properties.

A mask is then applied (block 502) to alternating bands of the PDLC compound. The mask may be impervious to the ultraviolet light, or other energy, used in the polymerization. The mask (block 502) is applied such that a second polymerizing treatment would affect just the un-masked bands (FIG. 1, 102).

A second polymerizing treatment is then applied (block 503) to the un-masked PDLC compound. Accordingly, those portions that are covered by the mask do not continue to polymerize as they do not see the ultraviolet, or other, energy applied (block 503) during the second polymerizing treatment. However, those portions that are un-masked, continue to polymerize via the ultraviolet, or other, energy. Accordingly, the result of such a method (500) is alternating bands (FIG. 1, 102), with adjacent bands (FIG. 1, 102) having been polymerized differently such that they have different light-scattering properties. Thus a banded PDLC screen privacy device (FIG. 1, 100) is generated that has different light-scattering properties per adjacent band (FIG. 1, 102).

Figure 6A:
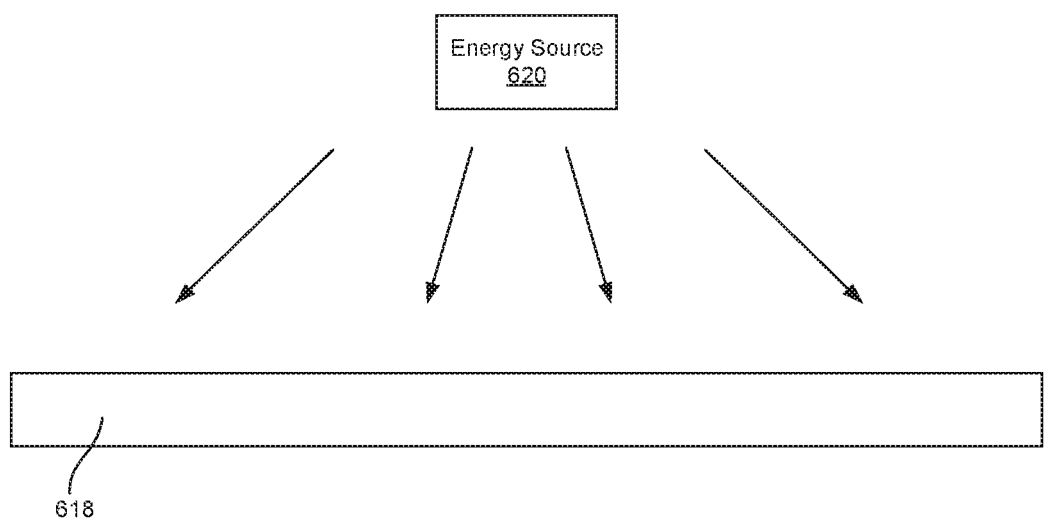
FIGS. 6A-6C are diagrams of the formation of a screen privacy device with alternating PDLC bands, according to an example of the principles described herein.
Figure 6B:
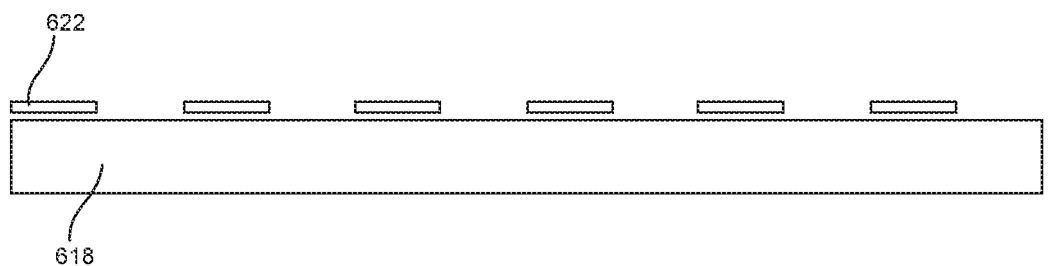
Figure 6C:
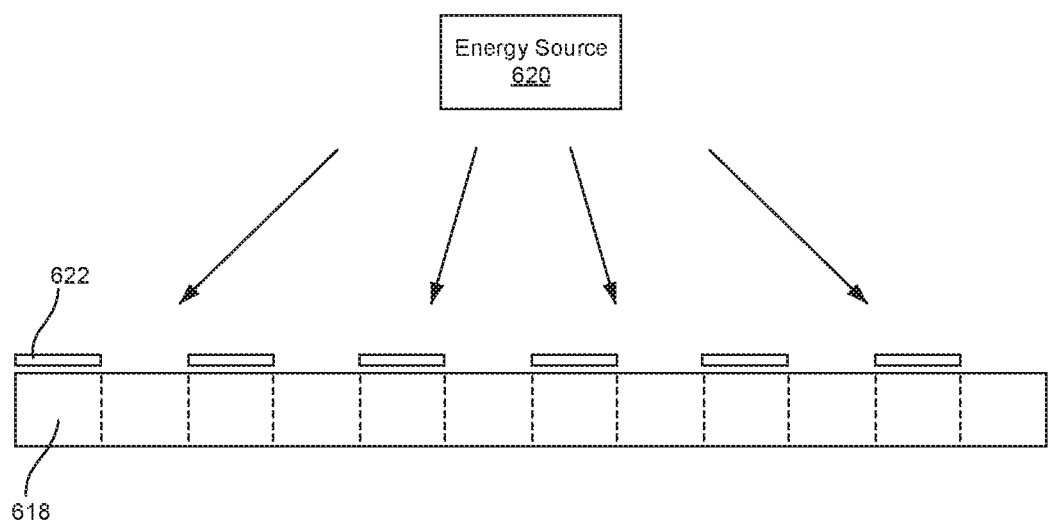

FIGS. 6A-6C are diagrams of the formation of a screen privacy device (FIG. 1, 100) with alternating PDLC bands (FIG. 1, 102), according to an example of the principles described herein. Specifically, FIG. 6A depicts the application of a first polymerizing treatment applied to the PDLC compound (618). That is, an ultraviolet light or other energy source (620) radiates beams of energy that alter the composition of the PDLC compound (618). For example, the ultraviolet light may cause the polymer matrix to harden. The treatment may have a variety of characteristics that may affect the light-scattering properties of the PDLC compound (618). A length of time that the PDLC compound (618) is exposed to the energy source (620) is one example of a characteristic.

In one example, the first polymerizing treatment may partially polymerize the PDLC compound (618). That is, the exposure time may not be sufficient enough to saturate the refractive index. In another example, the first polymerizing treatment fully polymerizes the PDLC compound (618). In this example, exposure time may be longer than for partial polymerization, and may saturate the refractive index of the PDLC matrix. In either case, the first polymerizing treatment may be defined in that it polymerizes the PDLC compound (618) to a lesser degree than a second polymerizing treatment. While specific reference is made to exposure time as a characteristic of the energy treatment, other characteristics exist as well including an intensity, wavelength, and/or temperature of the energy source (620).

Following the first polymerizing treatment, a mask (622) is placed over alternating regions of the PDLC compound (618) as depicted in FIG. 6B. The mask (622) may be formed of a material that is impervious to the beams radiated by the energy source (620) such that the PDLC compound (618) directly underneath the mask (622) is not subsequently polymerized.

Then, as depicted in FIG. 6C, a second polymerizing treatment is executed. Given that the portions covered by the mask (622) are not further affected by the energy beams from the energy source (620) and that those portions exposed are further affected by the energy beams, the result following the second polymerizing treatment is a banded PDLC compound (618) as indicated by the dashed lines, wherein the PDLC compound (618) within adjacent bands have different light-scattering properties.

In the case where the first polymerizing treatment partially-polymerized the PDLC compound (618), the second polymerizing treatment may fully-polymerize the exposed bands (FIG. 1, 102). In the example where the first polymerizing treatment fully polymerized the PDLC compound (618), the second polymerizing treatment may overdose the exposed bands (FIG. 1, 102). In either case, the result may be bands (FIG. 1, 102) of PDLC compound (618) that are less polymerized, or have been exposed to a reduced dosage of the energy source (620) alternated with bands (FIG. 1, 102) that are more polymerized, or that have been exposed to a greater dosage of the energy source (620).

In some examples, there may be differences between the first polymerizing treatment and the second polymerizing treatment. That is, the characteristics may be different. Examples of characteristics that may be different between the first polymerizing treatment and the second polymerizing treatment include an exposure time, an exposure intensity, an exposure wavelength, an exposure temperature, and/or a type of energy source (620).

Figure 7A:
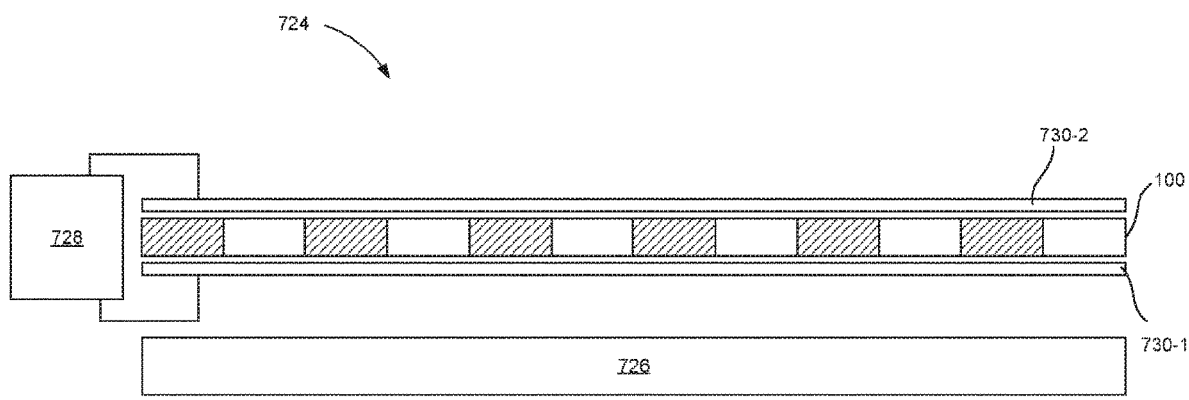
FIGS. 7A and 7B are diagrams of a display device with a screen privacy device with alternating PDLC bands, according to an example of the principles described herein.
Figure 7B:
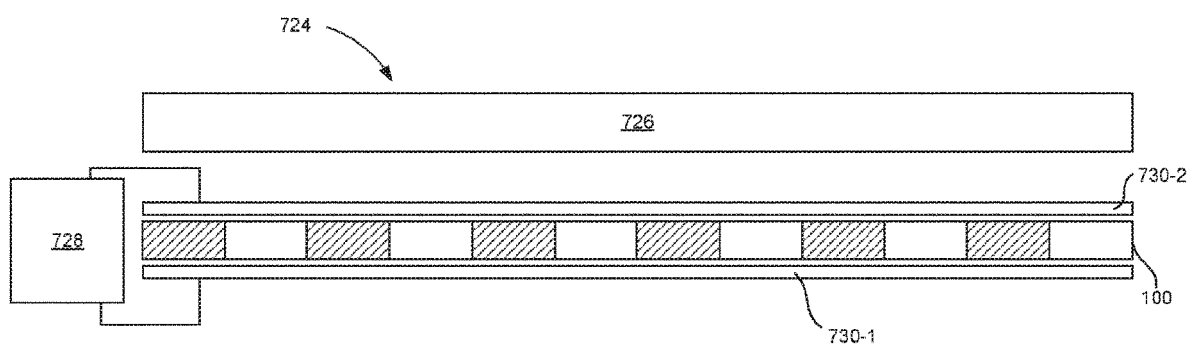

FIGS. 7A and 7B are diagrams of a display device (724) with a screen privacy device (100) with alternating PDLC bands (FIG. 1, 102), according to an example of the principles described herein. Specifically, FIG. 7A depicts the screen privacy device (100) disposed over the screen (726) and FIG. 7B depicts the screen privacy device (100) underneath the screen (726). Note that the elements depicted in FIGS. 7A and 7B are not drawn to scale and some components have been enlarged for reference.

To generate a visual output, the display device (724) includes a screen (726). The screen (726) may include any device, or component thereof, that permits transmission and output of information electronically to a user (e.g., viewer). The information may be visual or audio, among other formats of information presentation. In one example, the screen (726) has the capability of displaying at least visual signals. In one example, the screen (726) is an electronic visual display. The screen (726) may be a part of an electronic device. As used in the present specification and in the appended claims, an electronic device herein may refer to any device that includes an electrical circuit. The electronic device may be a consumer electronic device. Examples of electronic devices include portable/mobile electronic devices, a television, a computer, a desktop computer, a laptop, a tablet, and a gaming device among other electronic devices. A display screen of an electronic device may refer to a monitor, a liquid crystal display ("LCD"), an organic light-emitting diode ("FLED") display, a polymer light-emitting diode ("PLED") display a plasma display, an electrowetting display, and a bi-stable display. Examples of bi-stable displays include electrophoretic displays, cholesteric liquid crystal displays and MEMS-based displays. Other types of electronic displays are also possible.

Disposed on top of, or underneath, the screen (726) is the screen privacy device (100) as described herein with a PDLC compound (FIG. 6, 618) divided into bands (FIG. 1, 102) with the PDLC compound (FIG. 6, 618) in the different bands (FIG. 1, 102) having different light-scattering properties. As described above, the screen privacy device (100) under application of a voltage potential, alters the light-scattering modes of the PDLC compound (FIG. 6, 618). Accordingly, the display device (724) includes a pair of electrodes (730-1, 730-2) disposed on opposite surfaces of the PDLC compound (FIG. 6, 618) to selective apply a voltage potential across the screen privacy device (100).

The electrodes (730) may include a transparent conductive film. The transparent conductive film may be formed of inorganic materials, organic materials, or both. Examples of inorganic material include transparent conducting oxides such as indium tin oxide, fluorine doped tin oxide, and doped zinc oxide among other transparent conducting oxides. Examples of organic materials include carbon nanotubes, graphene, poly(3,4-ethylenedioxythiophene). In one example, the electrodes (730) include at least one of $In_2O_3$:Sn and $SnO_2$:F. The conductive electrodes (730) may provide suitable electrodes for applying a voltage across the screen privacy device (100).

The display device (724) includes a controller (728) to pass the voltage to the pair of electrodes (730) to selectively switch the screen privacy device (100) between a sharing mode and a privacy mode. That is, when no voltage is applied, the screen privacy device (100) may be said to be in a sharing mode wherein liquid crystals (FIG. 2, 204) are not aligned and therefore scatter the light emanating from the screen (726) in a multitude of directions. By comparison, the controller (728) may selective generate a voltage potential between the electrodes (730) by, for example passing a first voltage to one electrode (730-1) while holding the other electrode (730-2) to ground, Such a voltage potential places the screen privacy device (100) in a privacy mode wherein liquid crystals (FIG. 2, 204) are aligned and reflect light all at the same angle, thus reducing the overall viewing angle of the screen (726).

In some examples, different voltages may set the screen privacy device (100) to varying degrees of transparency. For example, a voltage of one value may set the screen privacy device (100) to a state that is more transparent and a voltage of a second value may set the screen privacy device (100) to a state that is less transparent. Put another way, a voltage of one value may effectuate greater privacy control by setting the liquid crystals (FIG. 2, 204) to a particular tilt angle and a voltage of a different value may effectuate lesser privacy control by setting the liquid crystals (FIG. 2, 204) to a different tilt angle that affords a different degree of privacy control.

In summary, using such a privacy screen device 1) provides enhanced security of private or confidential information presented on a display screen; 2) provides single-layer privacy, resulting in a thinner and more cost-effective screen privacy device; 3) provides screen privacy at a reduced power consumption level; 4) provides an enhanced viewing angle when in a sharing mode; and 5) is easy to manufacture. However, the devices disclosed herein may address other matters and deficiencies in a number of technical areas.

What is claimed is:

1. A screen privacy device, comprising:
   first bands of a polymer-dispersed liquid crystal (PDLC) compound, the first bands having first light-scattering properties; and
   second bands of the PDLC compound, the second bands having second light-scattering properties,
   wherein:
      the second light-scattering properties are different than the first light-scattering properties; and
      the first bands and the second bands alternate along a dimension of the screen privacy device.

2. The device of claim 1, wherein when a voltage is not applied to the screen privacy device, liquid crystals in both the first bands and the second bands are not aligned.

3. The device of claim 2, wherein when the voltage is applied to the screen privacy device:
   liquid crystals in the first bands are aligned; and
   liquid crystals in the second bands are not aligned.

4. The device of claim 1, wherein when a voltage is not applied to the screen privacy device:
   liquid crystals in both the first bands and the second bands are not aligned; and
   the PDLC compound in the second bands is partially-polymerized.

5. The device of claim 4, wherein when the voltage is applied to the screen privacy device:
   liquid crystals in the first bands and second bands are aligned; and
   the PDLC compound in the second bands is partially-polymerized.

6. A method, comprising:
   applying a first polymerizing treatment to a polymer-dispersed liquid crystal (PDLC) compound;
   applying a mask to alternating bands of the PDLC compound; and
   applying a second polymerizing treatment to un-masked PDLC compound to form alternating bands of the PDLC compound, the alternating bands having different light-scattering properties.

7. The method of claim 6, wherein:
   the first polymerizing treatment fully polymerizes the PDLC compound; and
   the second polymerizing treatment overdoses exposed bands of the PDLC compound.

8. The method of claim 7, wherein the second polymerizing treatment has different characteristics than the first polymerizing treatment.

9. The method of claim 6, wherein:
   the first polymerizing treatment partially polymerizes the PDLC compound; and
   the second polymerizing treatment fully polymerizes exposed bands of the PDLC compound.

10. The method of claim 9, wherein the second polymerizing treatment has different characteristics than the first polymerizing treatment.

11. A display device comprising:
    a screen to generate a visual output;
    a screen privacy device disposed over the screen, the screen privacy device comprising a polymer-dispersed liquid crystal (PDLC) compound being divided into alternate bands, wherein adjacent bands have, when a voltage is applied, different light-scattering properties;
    a pair of electrodes disposed on opposites surfaces of the PDLC compound to selectively apply a voltage potential across the PDLC compound; and
    a controller to pass a voltage to the pair of electrodes to selectively switch the PDLC compound between a first mode and a second mode.

12. The device of claim 11, wherein:
    the first bands are fully-polymerized bands; and
    the second bands are overdosed.

13. The device of claim 12, wherein:
    when in the first mode:
       liquid crystals in the fully-polymerized bands are not aligned with one another; and
       liquid crystals in the overdosed bands are note aligned with one another; and
    when in the second mode:
       liquid crystals in the fully-polymerized bands are aligned with one another; and
       liquid crystals in the overdosed bands are not aligned with one another.

14. The device of claim 11, wherein:
    the first bands are fully-polymerized bands; and
    the second bands are partially-polymerized.

15. The device of claim 14, wherein:
the partially-polymerized bands have a different index of refraction than the fully-polymerized bands;
when in the first mode liquid crystals in the fully-polymerized bands and the partially-polymerized bands are misaligned with one another; and
when in the second mode liquid crystals in the fully-polymerized bands and the partially-polymerized bands are aligned with one another.

* * * * *